United States Patent
Sakakibara

(10) Patent No.: US 8,405,354 B2
(45) Date of Patent: Mar. 26, 2013

(54) CHARGING CONTROL DEVICE AND ELECTRICITY STORAGE DEVICE INCLUDING A BATTERY

(75) Inventor: Hisayoshi Sakakibara, Nishio (JP)

(73) Assignee: Denso Corporation, Kariya (JP)

( * ) Notice: Subject to any disclaimer, the term of this patent is extended or adjusted under 35 U.S.C. 154(b) by 239 days.

(21) Appl. No.: 12/765,141

(22) Filed: Apr. 22, 2010

(65) Prior Publication Data

US 2010/0270974 A1 Oct. 28, 2010

(30) Foreign Application Priority Data

Apr. 22, 2009 (JP) ................................. 2009-103978

(51) Int. Cl.
*H02J 7/00* (2006.01)
(52) U.S. Cl. ........................................ 320/132; 320/109
(58) Field of Classification Search ................... 320/132
See application file for complete search history.

(56) References Cited

U.S. PATENT DOCUMENTS

| 4,673,825 | A | * | 6/1987 | Raddi et al. | ..................... 307/66 |
| 5,892,346 | A | * | 4/1999 | Moroto et al. | ................ 318/587 |
| 6,892,642 | B2 | * | 5/2005 | De Vroome | .................. 101/487 |
| 2001/0005124 | A1 | * | 6/2001 | Odeohhara et al. | ........... 320/116 |
| 2008/0183408 | A1 | * | 7/2008 | Matsuura et al. | ............... 702/63 |

FOREIGN PATENT DOCUMENTS

| JP | 2003-9418 | 1/2003 |
| JP | 3827676 | 7/2006 |

\* cited by examiner

*Primary Examiner* — Arun Williams
(74) *Attorney, Agent, or Firm* — Nixon & Vanderhye P.C.

(57) ABSTRACT

A charging control device for an electricity storage system includes a unit to detect an electricity remaining amount of a battery, a unit to calculate a necessary charge amount, a unit to calculate a necessary charge period, and a unit to start a charging from a charger to the battery at a start timing of nighttime. The start timing is defined to go back by the necessary charge period from a target timing, when the charging is defined to be finished at the target timing. The necessary charge amount is necessary for a following daytime, and is discharged for a load in the daytime.

9 Claims, 7 Drawing Sheets

FIG. 7

| | LAST CHARGING | | | | | | | NEXT CHARGING | | | | |
|---|---|---|---|---|---|---|---|---|---|---|---|---|
| | $Vi_1$ (V) | $Wi_1$ (Ah) | $Ve_1$ (V) | $We_1$ (Ah) | $C_1$ (Ah) | $K_1$ (—) | $Wr_2$ (Ah) | $Vi_2$ (V) | $Wi_2$ (Ah) | $K_1 \times Wi_2$ (Ah) | $Wc_2$ (Ah) |
| NON-DETERIORATED CASE | 80 | 1.6 | 92 | 5.2 | 3.6 | 1 | 5.2 | 80 | 1.6 | 1.6 | 3.6 |
| DETERIORATED CASE | 80 | 1.6 | 94 | 6.4 | 3.6 | 0.75 | 5.2 | 80 | 1.6 | 1.2 | 4.0 |

CHARGING CONTROL DEVICE AND ELECTRICITY STORAGE DEVICE INCLUDING A BATTERY

CROSS REFERENCE TO RELATED APPLICATION

This application is based on Japanese Patent Application No. 2009-103978 filed on Apr. 22, 2009, the disclosure of which is incorporated herein by reference in its entirety.

BACKGROUND OF THE INVENTION

1. Field of the Invention

The present invention relates to a charging control device and an electricity storage system.

2. Description of Related Art

Alternating voltage supplied from a utility power source is converted into direct-current voltage by a charger, and a home-use battery is charged by controlling the charger. Electricity is stored in the battery in nighttime, and the stored electricity is used in daytime, because electricity cost is low in nighttime.

JP-B2-3827676 discloses an electricity storage system, and the system operates in a nighttime mode, a discharge mode, or a utility backup mode. In the nighttime mode, a battery of the system is charged by a utility power source, and nighttime rate is applied to the charging during nighttime. In the discharge mode, electricity is supplied to a load only from the battery in accordance with a consumption power of the load. In the utility backup mode, electricity is supplied to the load from the battery before the consumption power of the load becomes larger than a predetermined value. Further, electricity is supplied from the utility power source, after the consumption power of the load becomes larger than the predetermined value. Therefore, nighttime electricity can be effectively used, and use of daytime electricity can be reduced, when the load requires electricity beyond the predetermined value.

JP-A-2003-9418 discloses a method of charging and discharging a lead battery. A power conditioner having a two-way converter is arranged between a bus and the lead battery. A controller controls the battery to be charged at a level equal to or lower than 90% of its capacity in a usual time. Further, the controller controls the battery to have a full-charging at a predetermined timing. Thus, the battery can be restricted from having early deterioration. That is, cycle life of the battery can be made longer, and over discharge of the battery can be reduced.

However, JP-B2-3827676 or JP-A-2003-9418 fails to disclose a reducing of battery deterioration in nighttime. JP-A-2003-9418 discloses the reducing of the early battery deterioration, by reducing a frequency to perform the full-charging. However, JP-A-2003-9418 fails to disclose a method of constantly reducing deterioration.

SUMMARY OF THE INVENTION

In view of the foregoing and other problems, it is an object of the present invention to provide a charging control device and an electricity storage system.

According to a first example of the present invention, a charging control device includes an electricity remaining amount detecting unit, a necessary charge amount calculating unit, a necessary charge period calculating unit, and a charging starting unit. A battery of an electricity storage system is charged by a charger in nighttime, and is discharged for a load in a following daytime. The electricity remaining amount detecting unit detects an electricity remaining amount Wi of the battery. The necessary charge amount calculating unit calculates a necessary charge amount Wc by subtracting the electricity remaining amount Wi from a necessary electricity amount Wr necessary for the following daytime. The necessary charge period calculating unit calculates a necessary charge period Tc necessary for charging the battery with the necessary charge amount Wc based on charging properties of the charger and the battery. The charging starting unit starts a charging from the charger to the battery at a start timing of the nighttime. The start timing is defined to go back by the necessary charge period Tc from a target timing, when the charging is defined to be finished at the target timing.

Accordingly, battery deterioration can be effectively reduced.

According to a second example of the present invention, an electricity storage system has a battery, a charger, a power conditioner, and a charging and discharging control device. The charger coverts alternating voltage of a utility power source to direct-current voltage so as to charge the battery with the direct-current voltage. The power conditioner coverts the direct-current voltage of the battery to alternating voltage so as to discharge the alternating voltage for a load. The charging and discharging control device outputs a control signal to the charger and the power conditioner. The charging and discharging control device controls the charger to charge the battery in a nighttime. The charging and discharging control device controls the battery to discharge for the load through the power conditioner in a daytime. The charging and discharging control device controls includes a necessary charge period calculating unit and a charging starting unit. The necessary charge period calculating unit calculates a necessary charge period Tc necessary for charging the battery. The charging starting unit starts the charging at a start timing. The necessary charge period Tc is calculated based on at least one of a before-charging electricity remaining amount of the battery and a necessary electricity remaining amount of the battery necessary for the daytime. The start timing is defined to go back by the necessary charge period Tc from a target timing, when the charging is defined to be finished at the target timing.

Accordingly, battery deterioration can be effectively reduced.

BRIEF DESCRIPTION OF THE DRAWINGS

The above and other objects, features and advantages of the present invention will become more apparent from the following detailed description made with reference to the accompanying drawings. In the drawings:

FIG. 7 is a diagram showing characteristic values of the battery in a non-deteriorated case and a deteriorated case;

DETAILED DESCRIPTION OF PREFERRED EMBODIMENT

First Embodiment

Figure 1:
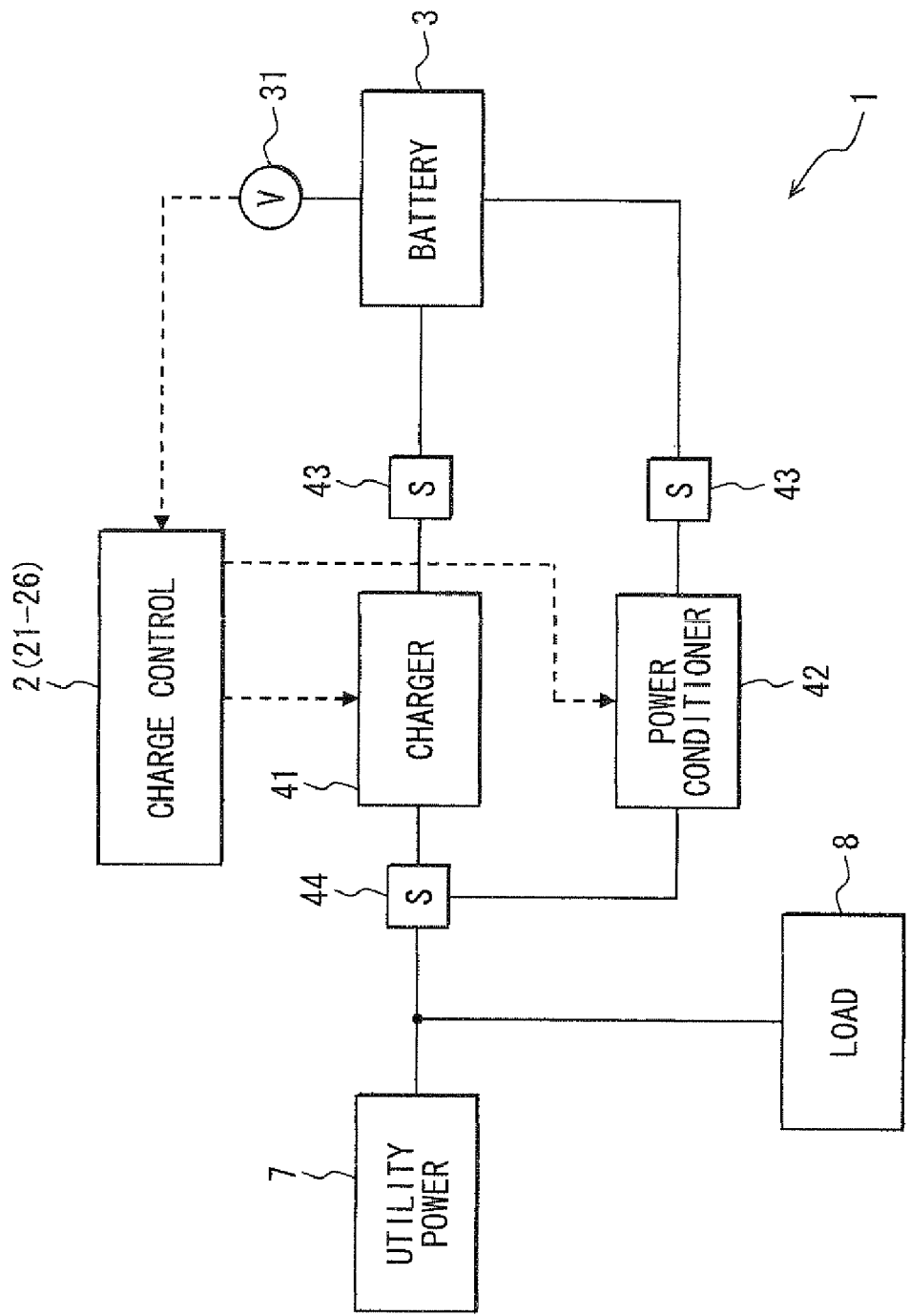
FIG. 1 is a block diagram illustrating an electricity storage system according to a first embodiment.

As shown in FIG. 1, a charging control device 2 is used in an electricity storage system 1. The charging control device 2 may correspond to a charging and discharging control device. The device 2 controls a charger 41 to charge a battery 3 by using a utility power source 7. The battery 3 is charged in nighttime B, and the charged electricity is discharged from the battery 3 to a load 8 in daytime A.

Figure 2:
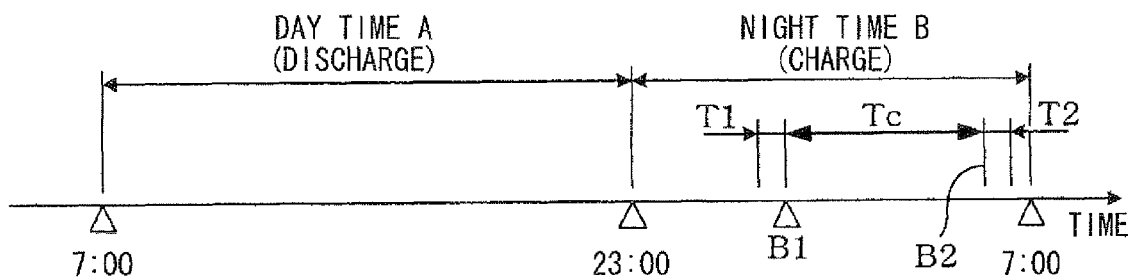
FIG. 2 is a time chart illustrating control timings for the electricity storage system.

As shown in FIG. 2, the nighttime B is defined from 23:00 to 7:00, and the daytime A is defined from 7:00 to 23:00, for example. Electricity cost of the daytime A is calculated based on daytime rate, and electricity cost of the nighttime B is calculated based on nighttime rate. The charging control device 2 may be a computer including an electricity remaining amount detecting unit 21, a necessary charge amount calculating unit 22, a necessary charge period calculating unit 23, and a charging starting unit 24.

The electricity remaining amount detecting unit 21 detects an electricity remaining amount Wi of the battery 3. The necessary charge amount calculating unit 22 calculates a necessary charge amount Wc by subtracting the electricity remaining amount Wi from a necessary electricity amount Wr necessary in daytime A. The necessary charge period calculating unit 23 calculates a necessary charge period Tc necessary for charging the necessary charge amount Wc based on charging properties of the charger 41 and the battery 3. The charging starting unit 24 starts charging from the charger 41 to the battery 3 at a start timing B1. As shown in FIG. 2, the start timing B1 is defined in a manner that the charging is completed at a target timing B2 of nighttime B after the necessary charge period Tc elapses from the start timing B1.

The charging control device 2 and the electricity storage system 1 will be specifically described with reference to FIGS. 1-7.

The battery 3 is made of lithium ion battery, for example. If electric charge is left in the lithium ion battery for a long time, capacity deterioration of the battery 3 is generated. In this case, life of the battery 3 is shortened. The utility power source 7 is a 100V or 200V alternating power source for home use. Due to the charging control device 2 and the electricity storage system 1, charging of nighttime electricity can be performed for home use.

Electricity cost is cheap in the nighttime B based on a contract with a utility power supplying company, compared with the daytime A. As shown in FIG. 2, the nighttime B is defined from 23:00 to 7:00, and the daytime A is defined from 7:00 to 23:00, for example.

A first period T1 is defined, after a discharging of the battery 3 is finished, and before a charging of the battery 3 is started. Either charging or discharging is not performed in the first period T1. A second period T2 is defined, after a charging of the battery 3 is finished, and before a discharging of the battery 3 is started. Either charging or discharging is not performed in the second period T2.

The target timing B2 is defined in a manner that the second period T2 is finished around an end of the nighttime B. Alternatively, the target timing B2 may be defined in a manner that the second period T2 is finished just at the end of the nighttime B.

As shown in FIG. 1, the electricity storage system 1 further includes a voltmeter 31 and a power conditioner 42. The voltmeter 31 measures a voltage of the battery 3. The charger 41 converts alternating voltage of the utility power source 7 into direct-current voltage, and charges the battery 3 with the direct-current voltage. The power conditioner 42 converts direct-current voltage of the battery 3 into alternating voltage, and discharges the alternating voltage for the load 8.

A switch 43 is arranged between the charger 41 and the battery 3, and another switch 43 is arranged between the power conditioner 42 and the battery 3. One of the charger 41 and the power conditioner 42 is connected to the battery 3 by operating the switches 43. A switch 44 is arranged to connect one of the charger 41 and the power conditioner 42 to the utility power source 7. The charging control device 2 controls the switches 43, 44. Thus, the charger 41 is connected to the utility power source 7 and the battery 3, or the power conditioner 42 is connected to the load 8 and the battery 3.

Voltage measured by the voltmeter 31 is input into the device 2, and the device 2 outputs control signal into the charger 41 and the power conditioner 42. Further, the device 2 performs a charging control and a discharging control. Due to the charging control, the battery 3 is charged by the charger 41 in nighttime B. Due to the discharging control of the power conditioner 42, electricity is discharged from the battery 3 into the load 8 in daytime A.

The device 2 further includes a charged electricity amount detecting unit 25 and a charging stopping unit 26. The charged electricity amount detecting unit 25 detects an amount of electricity charged in the battery 3 from the charger 41. The charging stopping unit 26 stops the charging, when the charged electricity amount detected by the unit 25 satisfies the necessary charge amount Wc, or when nighttime B is finished.

Further, the device 2 may have a discharged electricity amount detecting unit to detect an amount of electricity discharged from the battery 3 through the power conditioner 42. In this case, the electricity remaining amount detecting unit 21 detects the electricity remaining amount Wi of the battery 3 based on the charged electricity amount of the battery 3 and the discharged electricity amount from the battery 3.

Figure 3:
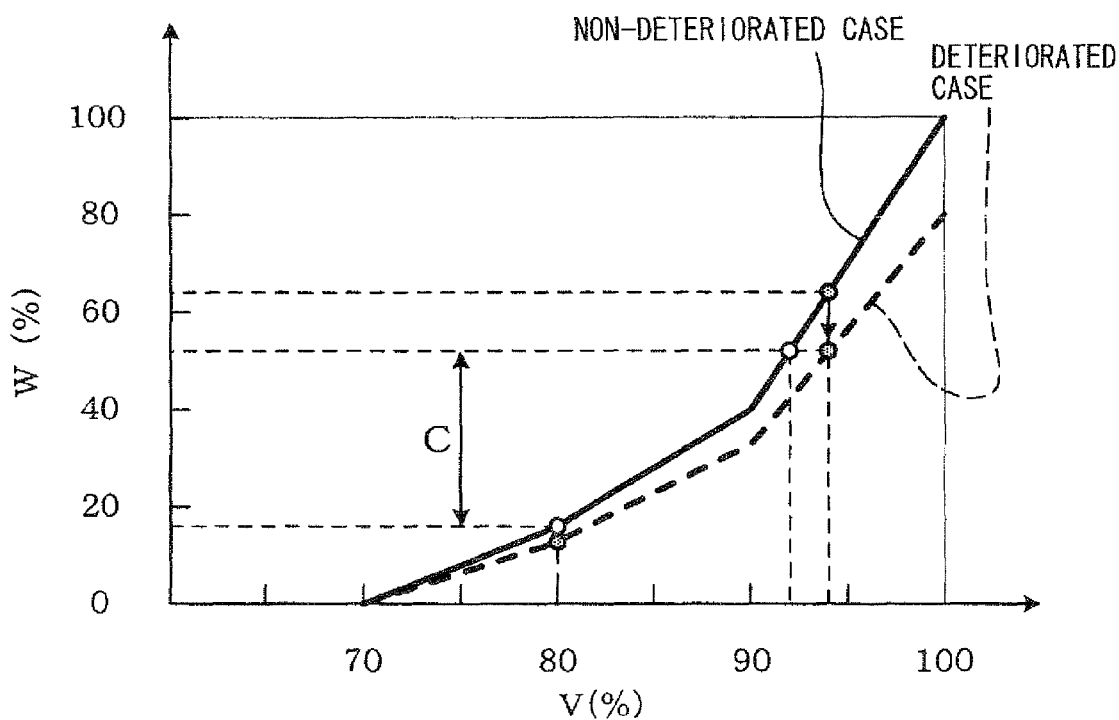
FIG. 3 is a graph illustrating a relationship between a voltage rate and an electricity remaining amount rate.

FIG. 3 shows a graph map M illustrating a relationship between a voltage rate V and an electricity remaining amount rate W. A lateral axis of the map M represents the voltage rate V (%) of the battery 3. The voltage rate V represents a ratio of an actual voltage (V) to a rated maximum voltage (V). A vertical axis of the map M represents the electricity remaining amount rate W (%). The electricity remaining amount rate W represents a ratio of an electricity remaining amount (Ah) to an initial chargeable capacity (Ah).

The map M is obtained in advance as a relationship between voltage and electricity remaining amount. The electricity remaining amount detecting unit 21 detects the electricity remaining amount Wi of the battery 3 by applying a voltage measured by the voltmeter 31 into the map M. The voltage and the electricity remaining amount are approximately proportional to each other. The map M is obtained in advance based on a kind of the battery 3. Due to the map M, the electricity remaining amount Wi can be easily detected.

Figure 4:
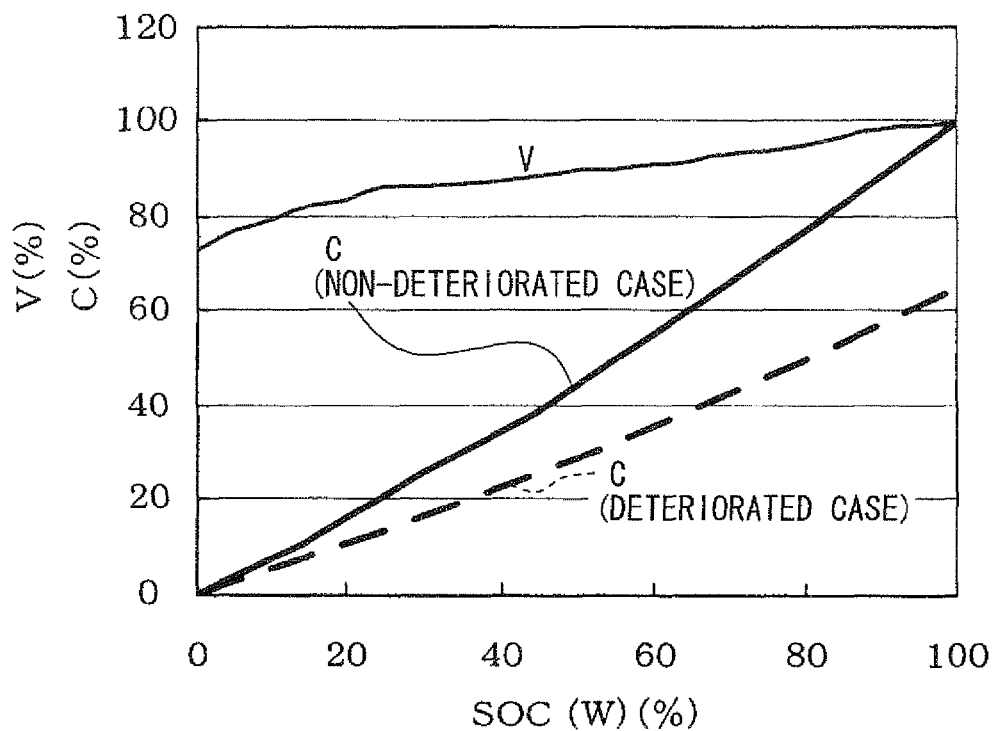
FIG. 4 is a graph illustrating a relationship between a state of charge and a charged electricity amount rate.

FIG. 4 shows a graph illustrating a relationship between a state of charge SOC and a charged electricity amount rate C. The state of charge SOC may correspond to the electricity remaining amount rate W. A lateral axis of FIG. 4 represents the state of charge SOC (%) of the battery 3. The state of charge SOC represents a ratio of an electricity remaining amount (Ah) to an initial chargeable capacity (Ah). A vertical axis of FIG. 4 represents the charged electricity amount rate C (%) of the battery 3. The charged electricity amount rate C represents a ratio of an actual charged electricity amount (Ah) to an initial charged electricity amount (Ah). Further, the vertical axis of FIG. 4 represents the voltage rate V (%) of the battery 3 defining the ratio of the actual voltage (V) to the rated maximum voltage (V). That is, FIG. 4 further illustrates a relationship between the state of charge SOC and the voltage rate V.

When a deterioration of the battery 3 is generated, effective chargeable capacity of the battery 3 is reduced. At this time, an error is generated in a value of the electricity remaining amount Wi relative to an actual electricity remaining amount, because the electricity remaining amount rate W is calculated by applying the voltage rate V into the map. Due to the error, the value of the electricity remaining amount Wi calculated based on the map M becomes higher than the actual value.

The device 2 calculates the necessary charge amount Wc based on the deterioration of the battery 3. That is, the error of the electricity remaining amount Wi of the battery 3 is corrected before a charging is started.

The electricity remaining amount detecting unit 21 measures a before-charging voltage Vi1 of the battery 3 in a last first period T1, and measures an after-charging voltage Ve1 of the battery 3 in a last time period T2. The charged electricity amount detecting unit 25 detects a charged electricity amount C1 of the battery 3 in the last time period T2. The necessary charge amount calculating unit 22 calculates an electricity remaining amount Wi1 by using the voltage Vi1, and calculates an electricity remaining amount We1 by using the voltage Ve1, based on the map M. Further, the necessary charge amount calculating unit 22 calculates a deterioration degree K1 of the battery 3 based on a formula $K1=C1/(We1-Wi1)$. Because the voltage Vi1, Ve1 is measured while a charging nor a discharging is not performed, error of the calculation of the deterioration degree K1 can be reduced.

Furthermore, the necessary charge amount calculating unit 22 calculates a necessary charge amount Wc2 for a next charging based on a formula $Wc2=Wr2-K1\times Wi2$. A necessary electricity amount Wr2 is defined to be necessary for the next charging, and an electricity remaining amount Wi2 is defined to be left before the next charging is started.

The actual charged electricity amount C1 can be detected by the unit 25. The device 2 calculates the deterioration degree K1 based on a ratio of the detected charged electricity amount C1 to an assumed charged electricity amount (We1−Wi1). The assumed charged electricity amount (We1−Wi1) is calculated by subtracting the before-charging electricity remaining amount Wi1 from the after-charging electricity remaining amount We1. The deterioration degree K1 is used as a correction coefficient relative to the electricity remaining amount Wi2 before the next charging is performed. Thus, the necessary charge amount Wc2 of the battery 3 can be more accurately calculated for the next charging, such that the battery 3 can be more accurately charged with the necessary electricity amount Wr2.

The after-charging voltage Ve1 may be measured when the charging is temporally stopped. The before-charging electricity remaining amount Wi may be calculated by subtracting the discharged electricity amount of the last daytime from the after-charging electricity remaining amount We of the last nighttime.

The detecting unit 25 detects a charged electricity amount of the battery 3 by using a charge meter of the charger 41, for example.

Figure 5:
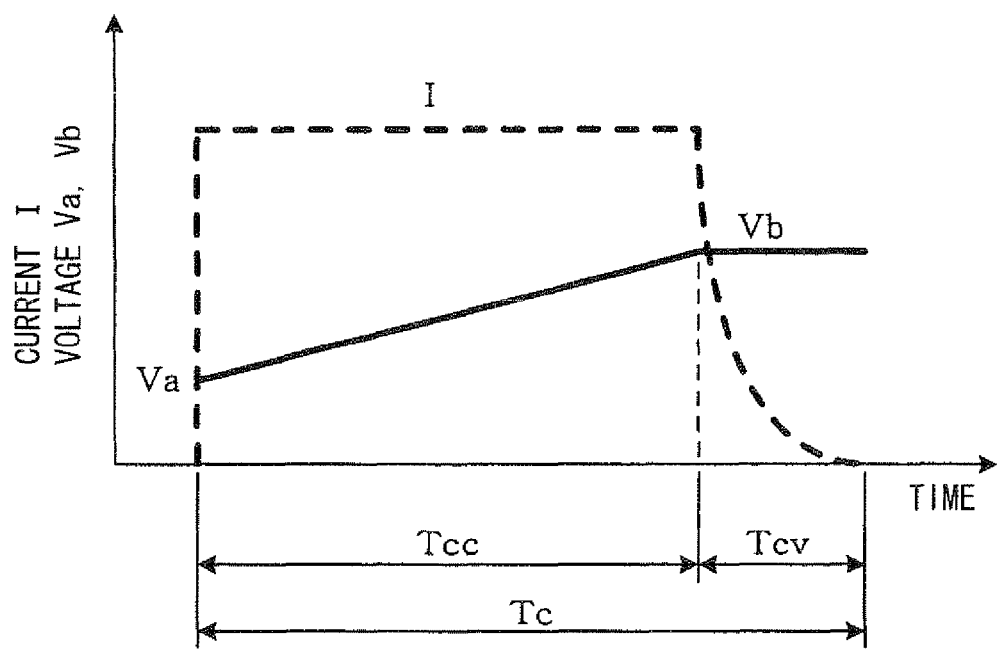
FIG. 5 is a graph illustrating a current and a voltage when a battery of the electricity storage system is charged.

As shown in FIG. 5, the device 2 performs a constant current charging operation, in which a voltage applied to the battery 3 from the charger 41 is increased from an initial voltage Va to an end voltage Vb. Thus, a current I flowing from the charger 41 to the battery 3 is constant. The device 2 further performs a constant voltage charging operation, in which a charging of the battery 3 is continued for a predetermined period Tcv until a value of the current I becomes approximately equal to zero. At this time, the voltage applied to the battery 3 from the charger 41 is maintained to be the end voltage Vb.

When the constant current charging operation is performed for a period of Tcc, the calculating unit 23 calculates the necessary charge period Tc based on a formula $Tc=Tcc+Tcv=Wc/\{(Va+Vb)/2\times I\}+Tcv$.

A charging and a discharging of the battery 3 will be described with reference to FIG. 6.

Figure 6:
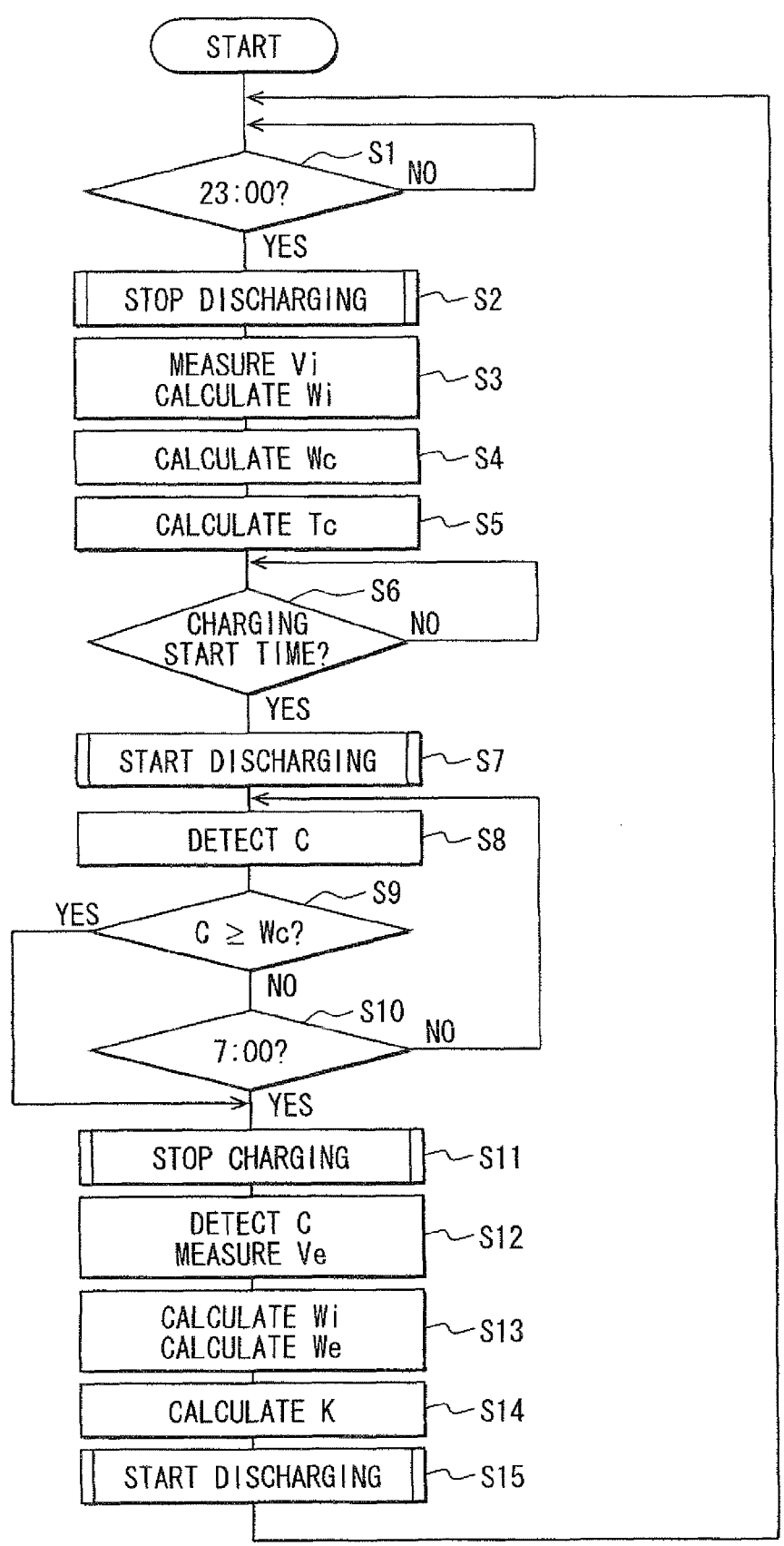
FIG. 6 is a flowchart illustrating an operation of a charging control device of the electricity storage system.

At S1 of FIG. 6, the device 2 determines the present time to pass 23:00 or not. When the device 2 determines the present time to pass 23:00 (Yes), a discharging for the load 8 is stopped at S2, because daytime A is finished. That is, nighttime B starts, and the device 2 operates the switches 43, 44. The charger 41 is connected to the utility power source 7 and the battery 3. Further, electricity is directly supplied to the load 8 from the utility power source 7.

At S3, a before-charging voltage Vi1 of the battery 3 is measured by the voltmeter 31 in the first period T1. Further, the detecting unit 21 calculates an electricity remaining amount Wi1 of the battery 3 by applying the voltage Vi1 into the map M of FIG. 3.

At S4, the calculating unit 22 calculates a necessary charge amount Wc1 by subtracting the electricity remaining amount Wi1 from a necessary electricity amount Wr1 necessary for a next daytime A. At this time, the necessary charge amount Wc1 may contain some excess amount.

At S5, the calculating unit 23 calculates a necessary charge period Tc1 necessary for charging the battery 3 to have the necessary charge amount Wc1 based on charging properties of the charger 41 and the battery 3. Specifically, the calculating unit 23 calculates the necessary charge period Tc1 based on a formula $Tc1=Wc1/\{(Va+Vb)/2\times I\}+Tcv$. At this time, the necessary charge period Tc1 may contain some excess period. Therefore, charging may be completed a little time earlier than the target timing B2 of the nighttime B.

At S6, the present time is determined to pass the start timing B1 or not. The start timing B1 is set by going back by the necessary charge period Tc1 from the target timing B2. When the present time is determined to pass the start timing B1 (Yes), the starting unit 24 starts a charging from the charger 41 to the battery 3 at S7.

At S8, the detecting unit 25 detects a charged electricity amount C charged from the charger 41 to the battery 3. At S9, the detected charged electricity amount C is determined to satisfy the necessary charge amount Wc1 or not. At S10, the nighttime B is determined to end or not. That is, the present time is determined to pass 7:00 or not at S10. Steps S8, S9, S10 are repeated until at least one of S9 and S10 is satisfied.

At S11, the stopping unit 26 stops the charging, when the charged electricity amount C becomes equal to the necessary charge amount Wc1, or when the nighttime B is finished.

At S12, the detecting unit 25 detects the charged electricity amount C in the second period T2, and memorizes the detected charged electricity amount C as a charged electricity amount C1. The detecting unit 21 measures a voltage of the battery 3, and memorizes the voltage as an after-charging voltage Ve1

At S13, the device 2 calculates the electricity remaining amount Wi1, We1 of the battery 3 by applying the voltage Vi1, Ve1 into the map M. The electricity remaining amount Wi1 represents a before-charging value, and the electricity remaining amount We1 represents an after-charging value.

At S14, the device 2 calculates a deterioration degree K1 of the battery 3 based on a formula K1=C1/(We1−Wi1).

At S15, the device 2 operates the switches 43, 44, and the power conditioner 42 converts electricity charged in the battery 3 from direct-current voltage to alternating voltage. A discharging is started for the load 8 in daytime A. Electricity is supplied to the load 8 mainly from the power conditioner 42. However, the utility power sources 7 may supply electricity for the load 8, if a load applied to the load 8 is increased.

Again for the next daytime A, at S1, the device 2 determines the present time to pass 23:00 or not. When the device 2 determines the present time to pass 23:00 (Yes), the discharging for the load 8 is stopped at S2, because the next daytime A is finished. That is, another nighttime B starts, and the device 2 operates the switches 43, 44. The charger 41 is connected to the utility power source 7 and the battery 3. Further, electricity is directly supplied to the load 8 from the utility power source 7.

At S3, a before-charging voltage Vi2 of the battery 3 is measured by the voltmeter 31 in a first period T1. Further, the detecting unit 21 calculates a before-charging electricity remaining amount Wi2 of the battery 3 by applying the voltage Vi2 into the map M.

At S4, the calculating unit 22 calculates a necessary charge amount Wc2 by using the deterioration degree K1 of the battery 3. At this time, a necessary electricity amount Wr2 is necessary for a next daytime A, and the before-charging electricity remaining amount has a value of Wi2. The calculation of the necessary charge amount Wc2 is performed based on a formula Wc2=Wr2−K1×Wi2. At this time, the necessary charge amount Wc2 may contain some excess amount.

At S5, the calculating unit 23 calculates a necessary charge period Tc2 necessary for charging the battery 3 to have the necessary charge amount Wc2 based on the charging properties of the charger 41 and the battery 3. Specifically, the calculating unit 23 calculates the necessary charge period Tc2 based on a formula Tc2=Wc2/{(Va+Vb)/2×I}+Tcv. At this time, the necessary charge period Tc2 may contain some excess period. Therefore, the charging may be completed a little time earlier than the target timing B2 of the nighttime B.

The necessary charge period Tc can be easily calculated in a system in which the charging is actually performed for the battery 3. Further, the necessary charge period Tc can be more accurately calculated by using the corrected value Wc2 of the necessary discharge amount Wc.

At S6, the present time is determined to pass the start timing B1 or not. The start timing B1 is set by going back by the necessary charge period Tc2 from the target timing B2. When the present time is determined to pass the start timing B1 (Yes), the starting unit 24 starts a charging from the charger 41 to the battery 3 at S7.

At S8, the detecting unit 25 detects a charged electricity amount C charged from the charger 41 to the battery 3. At S9, the detected charged electricity amount C is determined to satisfy the necessary charge amount Wc2 or not. At S10, the nighttime B is determined to end or not. Steps S8, S9, S10 are repeated until at least one of S9 and S10 is satisfied.

At S11, the stopping unit 26 stops the charging, when the charged electricity amount C becomes equal to the necessary charge amount Wc2, or when the nighttime B is finished.

At S12, the detecting unit 25 detects a charged electricity amount C in a second period T2, and memorizes the charged electricity amount C as a charged electricity amount C2. The detecting unit 21 measures a voltage of the battery 3, and memorizes the voltage of as an after-charging voltage Ve2.

At S13, the device 2 calculates an electricity remaining amount Wi2, We2 of the battery 3 by applying the voltage Vi2, Ve2 into the map M. The electricity remaining amount Wi2 represents a before-charging value, and the electricity remaining amount We2 represents an after-charging value.

At S14, the device 2 calculates a deterioration degree K2 of the battery 3 based on a formula K2=C2/(We2−Wi2). That is, the deterioration degree K2 of the battery 3 is timely updated from the deterioration degree K1 based on a past usage data such as usage time.

At S15, the device 2 operates the switches 43, 44, and the power conditioner 42 converts electricity charged in the battery 3 from direct-current voltage to alternating voltage. A discharging is started for the load 8 in daytime A.

Again, calculation of a necessary charge amount Wc3 is performed based on a formula Wc3=Wr3−K2×Wi3. Thus, charging of the battery 3 in nighttime B and discharging for the load 8 in daytime A can be repeated.

According to the charging control device 2 and the electricity storage system 1 of the first embodiment, the amount and the timing of the charging of the battery 3 are characteristic in the nighttime B in which electricity cost is cheap, and deterioration of the battery 3 can be reduced.

The battery 3 is charged with only the necessary amount necessary for daytime A. That is, the battery 3 can be restricted from having excess charging. Further, after a charging is finished around the end of the nighttime B, electricity stored in the battery 3 can be immediately discharged for the load 8.

Therefore, electricity remaining state of the battery 3 can be made shorter, such that the battery 3 can be effectively restricted from having deterioration.

The after-charging electricity remaining amount of the battery 3 may be made approximately equal to a chargeable capacity of the battery 3. In this case, period for which the battery 3 is charged in nighttime B is made close to period for which a discharge is performed for the load 8 in daytime A. Therefore, the battery 3 can be effectively restricted from having deterioration.

Simulation is performed for correcting a decreasing of the chargeable capacity of the battery 3, when the decreasing is generated by a deterioration of the battery 3. The simulation is an example of calculating the necessary charge amount Wc of the battery 3.

In FIG. 3, the battery 3 is defined to have a rated maximum voltage of 100(V), and an initial chargeable capacity of 10(Ah). A solid line of the map M shows a non-deteriorated case, and a dashed line of the map M shows a deteriorated case. FIG. 7 shows an example of calculating the necessary electricity amount Wr2 relative to the non-deteriorated case and the deteriorated case.

As shown in the non-deteriorated case of FIG. 7, a before-charging electricity remaining amount Wi1 is calculated to be 1.6(Ah) by applying a measured before-charging voltage Vi1=80(V) into the map M. An after-charging electricity remaining amount We1 is calculated to be 5.2(Ah) by applying a measured after-charging voltage Ve1=92(V) into the map M. A detected charged electricity amount C1 has a value of 3.6(Ah). A deterioration degree K1 of the battery 3 is calculated as K1=C1/(We1−Wi1)=3.6/(5.2−1.6)=1. When a necessary electricity amount Wr2 necessary for daytime A has a value of 5.2(Ah), a necessary charge amount Wc2 of the battery 3 is calculated as Wc2=Wr2−K1×Wi2=5.2−1× 1.6=3.6(Ah). When the charger 41 charges the battery 3 with an electricity amount C2 of 3.6(Ah), the battery 3 is secured to have the necessary electricity amount Wr2 of 5.2(Ah).

In contrast, in the deteriorated case of FIG. 7, a before-charging electricity remaining amount Wi1 is calculated to be 1.6(Ah) by applying a measured before-charging voltage Vi1=80(V) into the map M. An after-charging electricity remaining amount We1 is calculated to be 6.4(Ah) by applying a measured after-charging voltage Ve1=94(V) into the map M. A detected charged electricity amount C1 has a value of 3.6(Ah). A deterioration degree K1 of the battery 3 is calculated as K1=C1/(We1−Wi1)=3.6/(6.4−1.6)=0.75. When a necessary electricity amount Wr2 necessary for daytime A has a value of 5.2(Ah), a necessary charge amount Wc2 of the battery 3 is calculated as Wc2=Wr2−K1×Wi2=5.2−0.75×1.6=4.0(Ah). When the charger 41 charges the battery 3 with an electricity amount C2 of 4.0(Ah), the battery 3 is secured to have the necessary electricity amount Wr2 of 5.2(Ah).

Thus, the necessary charge amount Wc2 of the battery 3 is calculated based on the decreasing of the chargeable capacity, when the decreasing is generated by the deterioration of the battery 3. Therefore, the necessary electricity amount Wr2 can be more accurately charged in the battery 3.

Second Embodiment

A battery 3 is configured to be cooled by using cold energy emitted from a heat-pump hot water supplier 5, in a second embodiment. The supplier 5 is activated by receiving electricity from a utility power source 7 in nighttime B.

Figure 8:
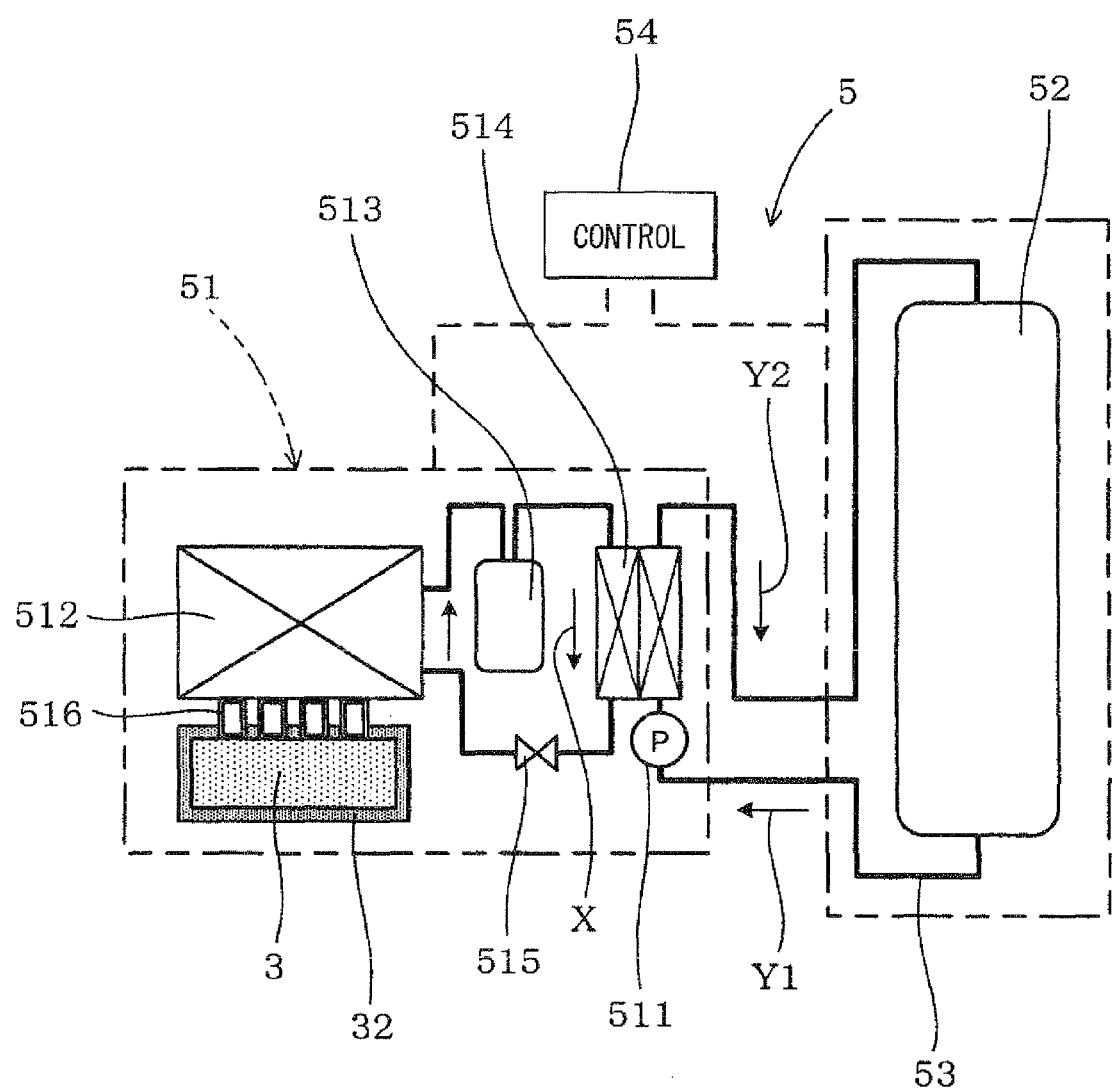
FIG. 8 is a diagram illustrating a heat-pump hot water supplier having a battery of an electricity storage system according to a second embodiment.

As shown in FIG. 8, the supplier 5 has a heat pump 51, a storage tank 52, a circulation pipe 53 and a controller 54. The controller 54 controls the supplier 5 to operate in nighttime B. Water Y1 flows into the tank 52, and is circulated in the pipe 53, due to a circulation pump 511.

Refrigerant X circulates in the heat pump 51, and heat transmission is performed by an evaporator 512 from air to refrigerant X. A temperature of the heated refrigerant X is further raised by a compressor 513. Heat is transmitted from refrigerant X to water Y1, due to a water-heat exchanger 514. Water Y1 is changed into hot water Y2 by the exchanger 514, and the hot water Y2 flows into the tank 52. In contrast, refrigerant X is cooled by the water Y1 in the exchanger 514. After the cooled refrigerant X passes through an expansion valve 515, again, heat is transmitted from air to the cooled refrigerant X through the evaporator 512. A heat pipe 516 is arranged under the evaporator 512 in a vertical direction.

The battery 3 is arranged on a cooling side of the heat pipe 516. The battery 3 is thermally connected to the evaporator 512 through the heat pipe 516. When refrigerant X is evaporated in the evaporator 512, heat is transmitted from the battery 3 to the refrigerant X. The battery 3 may be contact with the evaporator 512. When the battery 3 is not contact with the evaporator 512, the battery 3 may contact with outside air having a low temperature. The outside air has the low temperature, because the outside air passes through the evaporator 512. Further, when the battery 3 is covered with a heat insulation member 32, the battery 3 can be maintained to be cooled for a long time.

Figure 9:
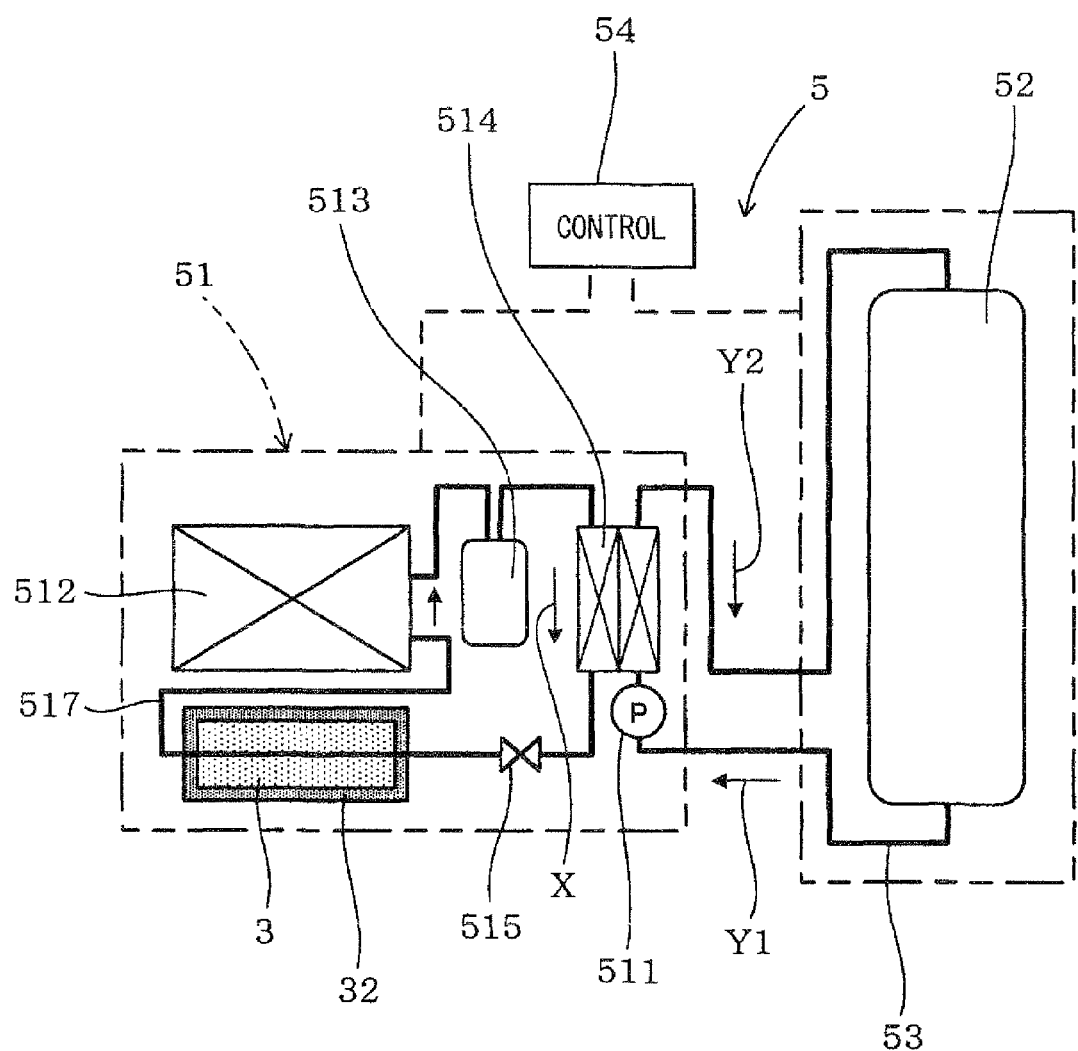
FIG. 9 is a diagram illustrating another heat-pump hot water supplier having the battery of the second embodiment.

As shown in FIG. 9, a bypass tube 517 is arranged on a downstream side of an expansion valve 515, and refrigerant X passes through the bypass tube 517. A battery 3 is cooled by the refrigerant X passing through the bypass tube 517.

Alternatively, the battery 3 may be arranged in a circulation passage (not shown). In this case, refrigerant such as brine is cooled by an evaporator 512, and the cooled refrigerant is circulated in the circulation passage.

A cycle life of the battery 3 is in reverse proportion to a temperature of the battery 3. As the temperature of the battery 3 is increased, the cycle life of the battery 3 is decreased. While the battery 3 is charged in nighttime B, the battery 3 can be cooled by using cold energy emitted from the hot water supplier 5 operating in the nighttime B. Therefore, according to the second embodiment, the cycle life of the battery 3 can be made longer by cooling the battery 3.

Other construction of the second embodiment is approximately similar to the first embodiment. Therefore, approximately the same advantages can be obtained in the second embodiment.

Changes and modifications are to be understood as being within the scope of the present invention as defined by the appended claims.

What is claimed is:

1. A charging control device for an electricity storage system having a battery, the battery being charged by a charger in nighttime and being discharged for a load in a following daytime, the charging control device comprising:
   an electricity remaining amount detecting unit to detect an electricity remaining amount Wi of the battery;
   a necessary charge amount calculating unit to calculate a necessary charge amount Wc by subtracting the electricity remaining amount Wi from a necessary electricity amount Wr necessary for the following daytime;
   a necessary charge period calculating unit to calculate a necessary charge period Tc necessary for charging the battery with the necessary charge amount Wc based on charging properties of the charger and the battery; and
   a charging starting unit to start a charging from the charger to the battery at a start timing of the nighttime, wherein
   the start timing is defined to go back by the necessary charge period Tc from a target timing, when the charging is defined to be finished at the target timing.

2. The charging control device according to claim 1, wherein
   the necessary charge amount calculating unit calculates the necessary charge amount Wc based on a deterioration degree of the battery.

3. The charging control device according to claim 2, further comprising:
   a charged electricity amount detecting unit to detect a charged electricity amount C charged from the charger to the battery; and
   a charging stopping unit to stop the charging, when the charged electricity amount C becomes equal to or larger than a predetermined value, or when the nighttime is finished, wherein
   the necessary charge amount calculating unit calculates the deterioration degree of the battery based on a relationship between the charged electricity amount C and a voltage of the battery.

4. The charging control device according to claim 3, wherein
   the electricity remaining amount detecting unit detects the electricity remaining amount Wi by applying the voltage of the battery into a predetermined relation map,
   the voltage of the battery is detected in at least one of a first period and a second period,
   the first period is defined between the discharging and the charging, either charging or discharging being not performed in the first period, and
   the second period is defined between the charging and a next discharging, either charging or discharging being not performed in the second period.

5. The charging control device according to claim 4, wherein
the electricity remaining amount detecting unit measures a voltage $Vi1$ of the battery in a last first period,
the electricity remaining amount detecting unit measures a voltage $Ve1$ of the battery in a last second period,
the charged electricity amount detecting unit detects a charged electricity amount $C1$ of the battery in the last second period,
the necessary charge amount calculating unit calculates a before-charging electricity remaining amount $Wi1$ by applying the voltage $Vi1$ into the map,
the necessary charge amount calculating unit calculates an after-charging electricity remaining amount $We1$ by applying the voltage $Ve1$ into the map,
the necessary charge amount calculating unit calculates the deterioration degree $K1$ of the battery based on a formula $K1=C1/(We1-Wi1)$, and
the necessary charge amount calculating unit calculates a necessary charge amount $Wc2$ for the next charging based on a formula $Wc2=Wr2-K1 \times Wi2$, when a necessary electricity amount $Wr2$ is necessary for the next charging, and when an electricity remaining amount $Wi2$ is left before the next charging is started.

6. The charging control device according to claim 1, wherein
a current I flowing from the charger to the battery is constant, while a voltage applied to the battery from the charger is increased from an initial voltage $Va$ to an end voltage $Vb$,
the end voltage $Vb$ is maintained until the current I becomes approximately equal to zero, such that that the charging of the battery is continued for a predetermined period $Tcv$, and
the necessary charge period calculating unit calculates the necessary charge period $Tc$ based on a formula $Tc=Wc/\{(Va+Vb)/2 \times I\}+Tcv$.

7. An electricity storage system comprising:
a battery;
a charger to covert alternating voltage of a utility power source to direct-current voltage so as to charge the battery with the direct-current voltage;
a power conditioner to covert the direct-current voltage of the battery to alternating voltage so as to discharge the alternating voltage for a load; and
a charging and discharging control device to output a control signal to the charger and the power conditioner, wherein
the charging and discharging control device controls the charger to charge the battery in a nighttime,
the charging and discharging control device controls the battery to discharge for the load through the power conditioner in a daytime,
the charging and discharging control device controls includes
a necessary charge period calculating unit to calculate a necessary charge period $Tc$ necessary for charging the battery, and
a charging starting unit to start the charging at a start timing,
the necessary charge period $Tc$ is calculated based on at least one of a before-charging electricity remaining amount of the battery and a necessary electricity remaining amount of the battery necessary for the daytime, and
the start timing is defined to go back by the necessary charge period $Tc$ from a target timing, when the charging is defined to be finished at the target timing.

8. The electricity storage system according to claim 7, further comprising:
a voltmeter to measure a voltage of the battery, wherein
the charging and discharging control device further includes
an electricity remaining amount detecting unit to detect the electricity remaining amount $Wi$ of the battery by applying the voltage of the battery into a predetermined relation map, and
a necessary charge amount calculating unit to calculate a necessary charge amount $Wc$ by subtracting the electricity remaining amount $Wi$ from the necessary electricity amount $Wr$, and
the necessary charge period calculating unit calculates the necessary charge period $Tc$ necessary for charging the battery with the necessary charge amount $Wc$ based on charging properties of the charger and the battery.

9. The electricity storage system according to claim 7, further comprising:
a heat-pump hot water supplier to be activated in the nighttime by receiving electricity from the utility power source, wherein
the battery is configured to be cooled by using cold energy emitted from the heat-pump hot water supplier in the nighttime, while the battery is charged.

* * * * *